(12) United States Patent
Wang et al.

(10) Patent No.: US 9,614,431 B2
(45) Date of Patent: Apr. 4, 2017

(54) CONTROL CIRCUIT AND MOTOR DEVICE

(71) Applicant: Johnson Electric S.A., Murten (CH)

(72) Inventors: En Hui Wang, Shenzhen (CN); Fei Xin, Shenzhen (CN); Chi Ping Sun, Hong Kong (CN); Ming Li Zhang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 14/856,946

(22) Filed: Sep. 17, 2015

(65) Prior Publication Data

US 2016/0006342 A1    Jan. 7, 2016

Related U.S. Application Data

(63) Continuation-in-part of application No. 13/072,110, filed on Mar. 25, 2011, now Pat. No. 9,166,444.

(30) Foreign Application Priority Data

Mar. 26, 2010  (CN) .......................... 2010 1 0138038

(51) Int. Cl.
| | |
|---|---|
| *H02H 7/10* | (2006.01) |
| *H02M 1/32* | (2007.01) |
| *H02P 6/14* | (2016.01) |
| *H02M 7/06* | (2006.01) |
| *H02P 6/26* | (2016.01) |
| *H02M 7/217* | (2006.01) |

(Continued)

(52) U.S. Cl.
CPC ............. *H02M 1/32* (2013.01); *H02M 7/066* (2013.01); *H02P 6/14* (2013.01); *H02P 6/26* (2016.02); *H02H 7/1222* (2013.01); *H02H 9/041* (2013.01); *H02M 7/2176* (2013.01)

(58) Field of Classification Search
USPC ............................................ 361/18
See application file for complete search history.

(56) References Cited

U.S. PATENT DOCUMENTS 3,582,713 A    6/1971  Till
3,989,995 A   11/1976  Peterson
(Continued)

FOREIGN PATENT DOCUMENTS

| CN | 1592020 A | 3/2005 |
|---|---|---|
| JP | 05284639 A  * | 10/1993 |
| JP | 11-215880 A | 8/1999 |

OTHER PUBLICATIONS

Kimura, JP 05284639 A, Selected text from Derwent, Oct. 1993.*

*Primary Examiner* — Ronald W Leja

(74) *Attorney, Agent, or Firm* — Muncy, Geissler, Olds & Lowe, P.C.

(57) ABSTRACT

A control circuit includes: an input terminal for receiving an input AC voltage; a voltage decreasing unit for decreasing the input AC voltage; an A-D converter for converting the decreasing AC voltage to a DC voltage; a driving unit for receiving the DC voltage and to driving a motor, a detecting unit for detecting the DC voltage; and a current shunt unit configured to be conductive to lower the DC voltage at the output terminal of the A-D converter to a voltage which is less than a threshold voltage when the detecting signal indicates that the detected DC voltage exceeds the threshold value. A motor device includes the control circuit and a motor.

15 Claims, 1 Drawing Sheet

(51) Int. Cl.
    *H02H 7/122*    (2006.01)
    *H02H 9/04*     (2006.01)

(56) References Cited

U.S. PATENT DOCUMENTS

| | | | |
|---|---|---|---|
| 4,525,651 A * | 6/1985 | Ahlgren | H02M 5/08 |
| | | | 315/227 R |
| 4,751,451 A | 6/1988 | Vincent | |
| 5,463,285 A * | 10/1995 | El-Hamamsy | H05B 41/2806 |
| | | | 315/209 R |
| 5,615,097 A | 3/1997 | Cross | |
| 5,708,574 A | 1/1998 | Crompton | |
| 5,808,847 A | 9/1998 | Ferrazzi | |
| 6,013,958 A * | 1/2000 | Aytur | H03J 3/185 |
| | | | 307/109 |
| 6,028,755 A | 2/2000 | Saeki et al. | |
| 6,246,562 B1 | 6/2001 | Durif | |
| 6,359,796 B2 | 3/2002 | Hartular et al. | |
| 6,608,405 B1 | 8/2003 | Zakharian | |
| 7,102,326 B1 | 9/2006 | Chen et al. | |
| 8,102,679 B2 | 1/2012 | Gong et al. | |
| 8,754,606 B2 * | 6/2014 | Xin | H02M 5/08 |
| | | | 318/729 |
| 9,166,444 B2 * | 10/2015 | Wang | H02J 7/345 |
| 2003/0107359 A1 | 6/2003 | Balakrishnan et al. | |
| 2003/0142516 A1 | 7/2003 | Noon et al. | |
| 2003/0151870 A1 | 8/2003 | Gronbach et al. | |
| 2007/0052299 A1 * | 3/2007 | Kawamura | G05B 19/058 |
| | | | 307/125 |
| 2007/0152648 A1 | 7/2007 | Gabello et al. | |
| 2007/0170900 A1 | 7/2007 | Lee | |
| 2008/0007891 A1 | 1/2008 | Doljack | |
| 2009/0310389 A1 | 12/2009 | Balakrishnan et al. | |
| 2010/0039836 A1 | 2/2010 | Gong et al. | |
| 2010/0054790 A1 * | 3/2010 | Inukai | G03G 15/5004 |
| | | | 399/88 |
| 2010/0066290 A1 | 3/2010 | Ting | |
| 2010/0123978 A1 | 5/2010 | Lin et al. | |
| 2011/0305047 A1 | 12/2011 | Jungreis et al. | |
| 2014/0043875 A1 | 2/2014 | Hsing et al. | |
| 2014/0334047 A1 | 11/2014 | Ahn | |
| 2016/0006342 A1 * | 1/2016 | Wang | H02M 7/066 |
| | | | 318/400.22 |

\* cited by examiner

CONTROL CIRCUIT AND MOTOR DEVICE

CROSS REFERENCE TO RELATED APPLICATIONS

This non-provisional patent application is a continuation in part of patent application Ser. No. 13/072,110 filed on Mar. 25, 2011.

FIELD OF THE INVENTION

This invention relates to an electrical power supply and in particular, to a power supply having over-voltage protection.

BACKGROUND OF THE INVENTION

A known control circuit for a fan powered by an AC mains voltage and driven by a DC motor uses a capacitor to decrease the AC mains voltage, and a rectifier for rectifying the decreased AC voltage to a DC voltage. When the load is small or capacitance of the capacitor is large, the output voltage of the rectifier will increase, which could possibly damage electronic components powered by the rectifier.

SUMMARY OF THE INVENTION

Hence there is a desire for a control circuit providing over-voltage protection for a power supply.

Accordingly, the present invention provides a control circuit comprising: an input terminal for receiving an input AC voltage; a voltage decreasing unit for decreasing the input AC voltage; an A-D converter for converting the decreasing AC voltage output from the voltage decreasing unit to a DC voltage; a driving unit for receiving the DC voltage output from the A-D converter and outputting voltage to drive a motor, a detecting unit for detecting the DC voltage and to produce a detecting signal indicating whether the detected DC voltage exceeds a predetermined threshold value; and a current shunt unit configured to be conductive to lower the DC voltage at the output terminal of the A-D converter to a voltage which is less than the threshold voltage when the detecting signal indicates that the detected DC voltage exceeds the threshold value, and to be non-conductive to allow the A-D converter output a DC voltage for the driving unit when the detecting signal indicates that the detected DC voltage is lower than the threshold value.

Preferably, the voltage decreasing unit comprises a capacitor unit connected between the input terminal and the input of the A-D converter.

Preferably, the capacitor unit comprises at least a fixed capacitor electrically connected between the input terminal and the A-D converter.

Preferably, the capacitor unit is an adjustable capacitor unit which comprises at least two fixed capacitors with fixed capacitance and a control unit for respectively and selectively, electrically connecting the at least two fixed capacitors between input terminal and the A-D converter.

Preferably, the control unit comprises at least two switches which are respectively electrically connected in series with the at least two fixed capacitors, and each switch and a corresponding capacitor form a switching capacitor and the at least two switching capacitors are electrically connected in parallel with each other; when a switch is closed or conductive, its corresponding capacitor is electrically connected between the AC power supply and the A-D converter; when a switch is open or non-conductive, its corresponding capacitor is electrically disconnected from the circuit with the AC power supply.

Preferably, the over-voltage detecting unit comprises a first Zener diode and the current shunt unit comprises a NPN transistor, the anode of the first Zener diode is electrically connected with the positive output of the A-D converter and the cathode of the first Zener diode is electrically with the base of the NPN transistor, the collector of the NPN transistor is connected with the positive output of the A-D converter, and the emitter of the NPN transistor is connected with the negative output of the A-D converter.

Preferably, the negative output of the A-D converter is connected with ground.

Preferably, the control circuit further comprises a low-voltage generating unit configured to generate a lower DC voltage from the output DC voltage of the A-D converter.

Preferably, the low-voltage generating unit comprises a resistor and a second Zener diode, one end of the resistor is electrically connected with the positive output of the A-D converter, the other end is electrically connected with the cathode of the second Zener diode, and the anode of the second Zener diode is electrically connected with the negative output of the A-D converter.

Preferably, a filtering capacitor electrically connected in parallel with the second Zener diode is arranged to make smooth or to stabilize the output of the low-voltage generating unit at the cathode of the second Zener diode.

Preferably, the driving unit comprises an inverter, a controller and a position detecting unit, the position detecting unit is configured to detect the position of the rotor of a BLDC motor and output a corresponding position signal, the controller is also powered by the lower DC voltage and configured to respond to the position signal to output a corresponding commutation signal, and the inverter is powered by the DC voltage output from the A-D converter and configured to respond to the commutation signal to control the power to the motor.

Preferably, the A-D converter, the driving unit, the over-voltage detecting unit, the current shunt unit and the low-voltage generating unit are arranged on a single printed circuit board.

Preferably, the voltage decreasing unit is mechanically independent from the printed circuit board but electrically connected with the printed circuit board.

Preferably, the threshold voltage is substantially equal to the nominal voltage of the input terminal.

Advantages of embodiments of the present invention include that the reliability of the circuit is high and the circuit cost is low. Besides, the speed of the motor can be easily adjusted.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
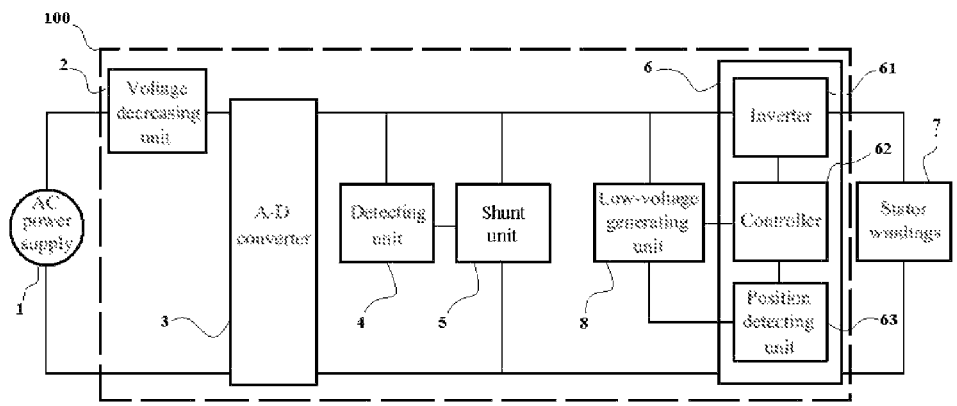
FIG. 1 is a block diagram of a control circuit in accordance with the preferred embodiment of the present invention.

A control circuit 100, as showing in FIG. 1, in accordance with the preferred embodiment of the present invention, is used for controlling a single phase brushless DC motor having a permanent magnet rotor and a stator with stator windings 7. The stator windings 7 represent an electrical load. The control circuit 100 is powered by an AC power supply 1 and comprises a voltage decreasing unit 2, an A-D converter 3 which is an AC-DC converter (hereinafter referred to as A-D converter), an over-voltage detecting unit 4, a current shunt unit 5, and a driving unit 6.

The voltage decreasing unit 2 is connected between the AC terminal of the AC power supply 1 and the positive input of the A-D converter 3. The voltage decreasing unit 2 comprises a capacitor unit for decreasing an AC voltage output from the AC power supply 1. The capacitor unit is electrically connected between the AC power supply 1 and the A-D converter 3.

Figure 2:
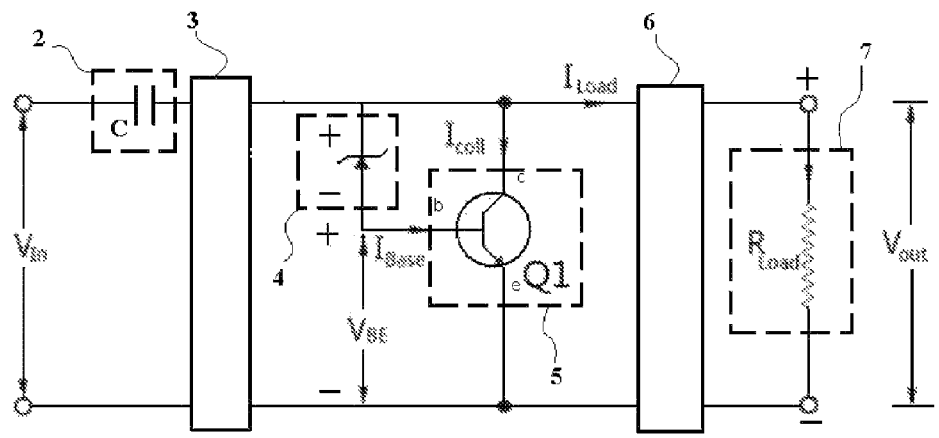
FIG. 2 shows a control circuit of FIG. 1.

Specifically, in this embodiment, as showing in FIG. 2, the capacitor unit comprises at least a fixed capacitor C electrically connected between the AC terminal of the AC power supply 1 and the positive input of the A-D converter 3.

Figure 3:
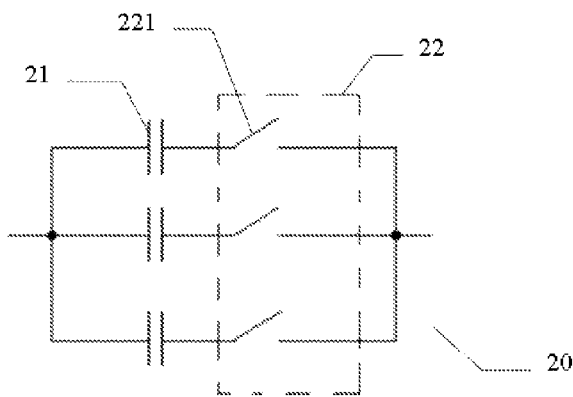
FIG. 3 shows a voltage decreasing unit of the control circuit of FIG. 1 in an alternative embodiment.

Alternatively, in another embodiment, as showing in FIG. 3, the capacitor unit is an adjustable capacitor unit 20 which comprises at least two fixed capacitors 21 with fixed capacitance and a control unit 22 for respectively and selectively, electrically connecting the at least two fixed capacitors 21 between the AC terminal of the AC power supply 1 and the positive input of the A-D converter 3. The control unit 22 comprises at least two switches 221 which are respectively electrically connected in series with the at least two fixed capacitors 21. Each switch 221 and a corresponding capacitor 21 form a switching capacitor and the at least two switching capacitors are electrically connected in parallel with each other. When a switch 221 is closed or conductive, its corresponding capacitor 21 is electrically connected between the AC power supply 1 and the A-D converter 3. When a switch 221 is open or non-conductive, its corresponding capacitor 21 is electrically disconnected from the circuit with the AC power supply 1. Therefore, by selectively controlling each switch 221, the fixed capacitors 21 can be electrically connected or disconnected between the AC power supply 1 and the A-D converter 3 to adjust the capacitance of the adjustable capacitor unit 20, thereby adjusting the output voltage of the voltage decreasing unit 2. The output voltage from the voltage decreasing unit 2 is adjusted by adjusting the capacitance of the adjustable capacitor unit 20, thus the speed of the motor can be easily adjusted by a simple and low cost circuit.

The A-D converter 3 is configured to convert the decreased AC voltage output of the voltage decreasing unit 2 to a DC voltage. Preferably, the A-D converter 3 comprises a bridge rectifier circuit.

The driving unit 6 is powered by the DC voltage from the A-D converter 3 and configured to drive the BLDC motor.

The combination of the over-voltage detecting unit 4 and the current shunt unit 5 is configured to carry out over-voltage protection for the DC voltage output from the A-D converter 3 to prevent electronic components powered by the DC voltage from being damaged. The detecting unit 4 is configured to detect the DC voltage at the output terminal of the A-D converter 3 and to produce a detecting signal indicating whether the detected DC voltage exceeds a predetermined threshold value.

The current shunt unit 5 is configured to be conductive to lower the DC voltage at the output terminal of the A-D converter 3 to a voltage which is less than the threshold voltage when the detecting signal indicates that the detected DC voltage exceeds the threshold value, and to be non-conductive to allow the A-D converter 3 to function normally and output a DC voltage for the driving unit 6 when the detecting signal indicates that the detected DC voltage is lower than the threshold value.

The detecting unit 4 detects the output voltage of the A-D converter 3. If the output voltage of the A-D converter 3 exceeds the predetermined threshold value, the current shunt unit 5 is made conductive and the output voltage of the A-D converter 3 is reduced. When the detecting unit 4 detects the output voltage of the A-D converter 3 is lower than the threshold value, the current shunt unit 5 is nonconductive. As a result, the output voltage of the A-D converter 3 supplies power to the motor normally. Thus, the output voltage of the A-D converter 3 can be kept basically stable relative to the threshold value, over-voltage protection can be realized and the reliability of the circuit can be improved.

Specifically, as showing in FIG. 2, the over-voltage detecting unit 4 comprises a first Zener diode and the current shunt unit 5 comprises a NPN transistor. A cathode of the first Zener diode is electrically connected with the positive output of the A-D converter 3 and an anode of the first Zener diode is electrically with the base of the NPN transistor. The collector of the NPN transistor is connected with the positive output of the A-D converter 3 and the emitter of the NPN transistor is connected with the negative output of the A-D converter 3. The negative output of the A-D converter 3 is connected with ground.

Preferably, as showing in FIG. 1, the control circuit 100 further comprises a low-voltage generating unit 8 is configured to generate a lower DC voltage from the output DC voltage of the A-D converter 3. The low-voltage generating unit 8 comprises a resistor and a second Zener diode. One end of the resistor is electrically connected with the positive output of the A-D converter 3, the other end is electrically connected with the cathode of the second Zener diode, and the anode of the second Zener diode is electrically connected with the negative output of the A-D converter 3. Further, a filtering capacitor electrically connected in parallel with the second Zener diode may be arranged to make smooth or to stabilize the output of the low-voltage generating unit 8 at the cathode of the second Zener diode.

Specifically, as showing in FIG. 1, the driving unit 6 comprises an inverter 61, a controller 62 and a position detecting unit 63. The position detecting unit 63 may be a Hall sensor which is powered by the lower DC voltage and configured to detect the position of the rotor of the BLDC motor and output a corresponding position signal. The controller 62 is also powered by the lower DC voltage and configured to respond to the position signal to output a corresponding commutation signal. The controller 62 can be realized by a microcontroller or by a switching circuit constituted by electronic components such as resistor and switch. The inverter 61 is powered by the DC voltage output from the A-D converter 3 and configured to respond to the commutation signal to control the power to the motor.

In embodiments of the present invention, the A-D converter 3, the driving unit 6, the over-voltage detecting unit 4, the current shunt unit 5 and the low-voltage generating unit 8 may be arranged on a single printed circuit board, and the voltage decreasing unit 2 may be mechanically independent from the printed circuit board but electrically connected with the printed circuit board. Also, while the threshold voltage may be any desired value, it is preferred that the threshold voltage is substantially equal to the nominal voltage of the input terminal. The nominal voltage is the desired normal operating voltage, i.e., the design value of the output voltage of the A-D converter 3.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A control circuit comprising:
   an input terminal for receiving an input AC voltage;
   a voltage decreasing unit for decreasing the input AC voltage;
   an A-D converter for converting the decreasing AC voltage output from the voltage decreasing unit to a DC voltage;
   a driving unit for receiving the DC voltage output from the A-D converter and outputting voltage to drive a motor, an over-voltage detecting unit for detecting the DC voltage and to produce a detecting signal indicating whether the detected DC voltage exceeds a predetermined threshold value; and
   a current shunt unit configured to be conductive to lower the DC voltage at the output terminal of the A-D converter to a voltage which is less than the predetermined threshold voltage when the detecting signal indicates that the detected DC voltage exceeds the predetermined threshold value, and to be non-conductive to allow the A-D converter output a DC voltage for the driving unit when the detecting signal indicates that the detected DC voltage is lower than the predetermined threshold value;
   a low-voltage generating unit configured to generate a lower DC voltage from the output DC voltage of the A-D converter; and
   wherein the over-voltage detecting unit comprises a first Zener diode and the current shunt unit comprises a NPN transistor, a cathode of the first Zener diode is electrically connected with the positive output of the A-D converter and an anode of the first Zener diode is only electrically connected with a base of the NPN transistor, a collector of the NPN transistor is connected with the positive output of the A-D converter, and an emitter of the NPN transistor is connected with the negative output of the A-D converter;
   wherein the driving unit comprises an inverter, a controller and a position detecting unit, the position detecting unit is configured to detect the position of the rotor of a BLDC motor and output a corresponding position signal, the controller is also powered by the lower DC voltage and configured to respond to the position signal to output a corresponding commutation signal, and the inverter is powered by the DC voltage output from the A-D converter and configured to respond to the commutation signal to control the power to the motor.

2. The control circuit of claim 1, wherein the voltage decreasing unit comprises a capacitor unit connected between the input terminal and the input of the A-D converter.

3. The control circuit of claim 2, wherein the capacitor unit comprises at least a fixed capacitor electrically connected between the input terminal and the A-D converter.

4. The control circuit of claim 2, wherein the capacitor unit is an adjustable capacitor unit which comprises at least two fixed capacitors with fixed capacitance and a control unit for respectively and selectively, electrically connecting the at least two fixed capacitors between input terminal and the A-D converter.

5. The control circuit of claim 4, wherein the control unit comprises at least two switches which are respectively electrically connected in series with the at least two fixed capacitors, and each switch and a corresponding capacitor form a switching capacitor and the at least two switching capacitors are electrically connected in parallel with each other; when a switch is closed or conductive, its corresponding capacitor is electrically connected between the AC power supply and the A-D converter; when a switch is open or non-conductive, its corresponding capacitor is electrically disconnected from the circuit with the AC power supply.

6. The control circuit of claim 1, wherein the negative output of the A-D converter is connected with ground.

7. The control circuit of claim 1, wherein the low-voltage generating unit comprises a resistor and a second Zener diode, one end of the resistor is electrically connected with the positive output of the A-D converter, the other end is electrically connected with the cathode of the second Zener diode, and the anode of the second Zener diode is electrically connected with the negative output of the A-D converter.

8. The control circuit of claim 7, wherein a filtering capacitor electrically connected in parallel with the second Zener diode is arranged to make smooth or to stabilize the output of the low-voltage generating unit at the cathode of the second Zener diode.

9. The control circuit of claim 1, wherein the A-D converter, the driving unit, the over-voltage detecting unit, the current shunt unit and the low-voltage generating unit are arranged on a single printed circuit board.

10. The control circuit of claim 9, wherein the voltage decreasing unit is mechanically independent from the printed circuit board but electrically connected with the printed circuit board.

11. The control circuit of claim 1, the threshold voltage is substantially equal to the nominal voltage of the input terminal.

12. A motor device comprising a motor and a control circuit; the control circuit having an input terminal for receiving an input AC voltage;
   a voltage decreasing unit decreasing the input AC voltage;
   an A-D converter converting the decreasing AC voltage output from the voltage decreasing unit to a DC voltage;
   a driving unit driving the motor and receiving the DC voltage output from the A-D converter and outputting voltage to drive a motor, an over-voltage detecting unit for detecting the DC voltage and to produce a detecting signal indicating whether the detected DC voltage exceeds a predetermined threshold value;
   a low-voltage generating unit configured to generate a lower DC voltage from the output DC voltage of the A-D converter; and a current shunt unit configured to be conductive to lower the DC voltage at the output terminal of the A-D converter to a voltage which is less than the predetermined threshold voltage when the detecting signal indicates that the detected DC voltage exceeds the predetermined threshold value, and to be non-conductive to allow the A-D converter output a DC voltage for the driving unit when the detecting signal indicates that the detected DC voltage is lower than the predetermined threshold value;

wherein the driving unit comprises an inverter, a controller and a position detecting unit, the position detecting unit is configured to detect the position of the rotor of the motor and output a corresponding position signal, the controller is also powered by the lower DC voltage and configured to respond to the position signal to output a corresponding commutation signal, and the inverter is powered by the DC voltage output from the A-D converter and configured to respond to the commutation signal to control the power to the motor.

13. The motor device of claim 12, wherein the motor is a BLDC motor.

14. The motor device of claim 13, wherein the motor is a single-phase BLDC motor.

15. A control circuit comprising:
an input terminal for receiving an input AC voltage;
a voltage decreasing unit for decreasing the input AC voltage;
an A-D converter for converting the decreasing AC voltage output from the voltage decreasing unit to a DC voltage;
a driving unit for receiving the DC voltage output from the A-D converter and outputting voltage to drive a motor, an over-voltage detecting unit for detecting the DC voltage and to produce a detecting signal indicating whether the detected DC voltage exceeds a predetermined threshold value;
a low-voltage generating unit configured to generate a lower DC voltage from the output DC voltage of the A-D converter; and
a current shunt unit configured to be conductive to lower the DC voltage at the output terminal of the A-D converter to a voltage which is less than the predetermined threshold voltage when the detecting signal indicates that the detected DC voltage exceeds the predetermined threshold value, and to be non-conductive to allow the A-D converter output a DC voltage for the driving unit when the detecting signal indicates that the detected DC voltage is lower than the predetermined threshold value; and wherein the driving unit comprises an inverter, a controller and a position detecting unit, the position detecting unit is configured to detect the position of the rotor of a motor and output a corresponding position signal, the controller is also powered by the lower DC voltage and configured to respond to the position signal to output a corresponding commutation signal, and the inverter is powered by the DC voltage output from the A-D converter and configured to respond to the commutation signal to control the power to the motor.

* * * * *